May 4, 1954  M. E. DROZ  2,677,199
SIMULATED SCAN FOR TRAINERS
Filed Nov. 30, 1945  3 Sheets-Sheet 1

INVENTOR
MARCEL E. DROZ

BY

ATTORNEY

May 4, 1954 M. E. DROZ 2,677,199
SIMULATED SCAN FOR TRAINERS
Filed Nov. 30, 1945 3 Sheets-Sheet 3

INVENTOR
MARCEL E. DROZ
BY
ATTORNEY

Patented May 4, 1954

2,677,199

UNITED STATES PATENT OFFICE 2,677,199

SIMULATED SCAN FOR TRAINERS

Marcel E. Droz, Cambridge, Mass., assignor, by mesne assignments, to the United States of America as represented by the Secretary of the Navy Application November 30, 1945, Serial No. 631,957

13 Claims. (Cl. 35—10.4)

This invention relates to radar training systems; more particularly, it relates to a radar training system for the production of artificial targets for simulating certain indications on a cathode ray tube screen.

It is desirable to provide means for producing artificial target information and feeding this information into existing radar set components for training purposes. Such an arrangement should enable an instructor to reproduce various target conditions of a given radar system on standard system indicators, while presenting to the student the actual equipment controls normally encountered in using the radar system. The system herein described involves a type H or conical scan described in detail in the specification which follows.

It is an object of this invention to provide a means for feeding artificial target information through the existing panel jacks and plugs to the indicator circuits of a trainer for a radar system using a type H conical scan.

It is a further object of this invention to provide means to enable an instructor to vary the position of simulated targets on the cathode ray screen.

A further object of the invention is to provide apparatus to furnish blocks of signals to the indicator circuits of the trainer which will have the character of real target signals without the necessity for an entire radar system, aircraft, or actual targets.

Other objects of this invention will become apparent from the following description together with the accompanying drawings, in which.

Figure 1:
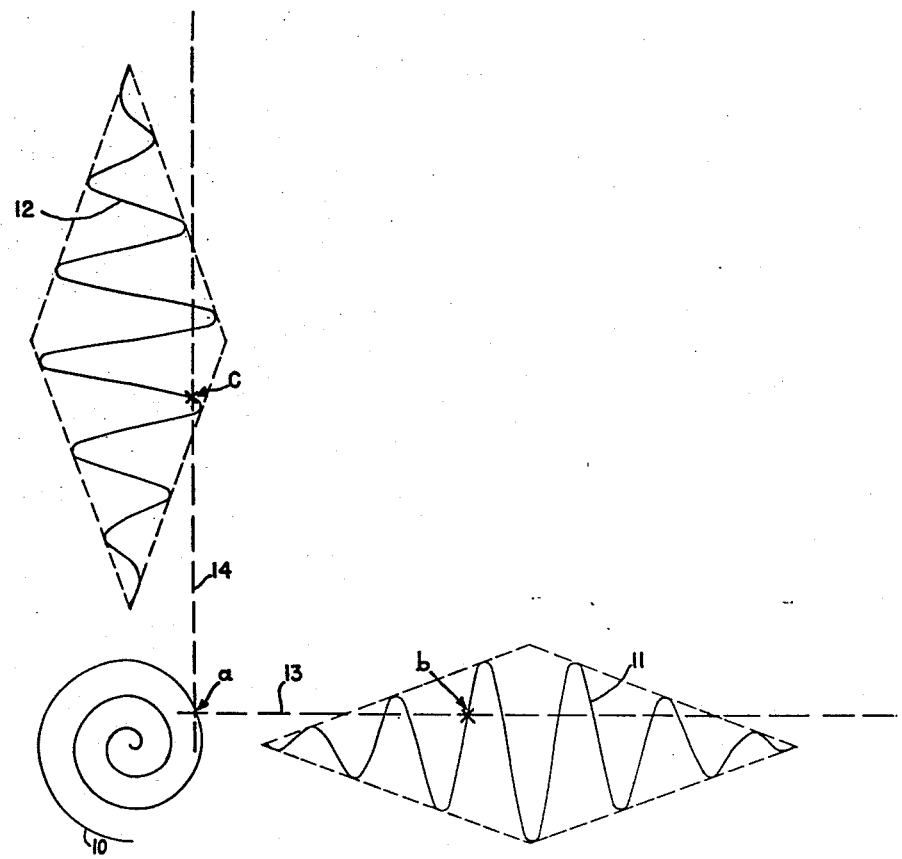
Fig. 1 is a graph useful in explaining the simulated motions of an antenna.

A conical scan may be defined as a scan in which an electromagnetic beam is rotated from a point at which the beam originates on a given axis in space in such a manner that the axis of the beam generates a conical surface about the given axis. The cone angle of the surface first increases linearly with respect to time to a maximum value and then decreases linearly with respect to time to zero. A given point on the beam axis traces a spiral lying on the surface of a sphere, the center of the sphere being at the antenna and its radius being the distance from the antenna to the given point. Such a spiral is indicated by curve 10 in Fig. 1 for the increasing cone angle, the decreasing spiral is omitted for the sake of clarity. It is obvious that a target in the field of the antenna scan, as indicated at point $a$ on the spiral, will be illuminated by the electro-magnetic beam at least once for every complete spiral traced.

The spiral motion described above may be resolved into two components mutually at right angles, as shown by curves 11 and 12, it being understood that the latter half of curves 11 and 12 correspond to the omitted decreasing part of spiral 10. Each of these motions is a sine wave of fixed frequency whose amplitude increases linearly with respect to time from zero to a maximum and then decreases linearly at the same rate to zero, as indicated by the dotted envelope line of Fig. 1. The component motions are in phase quadrature.

The recurrence frequency of the two sinusoidal motions described by curves 11 and 12 is equal to the rotational speed of the antenna of the simulated radar system. The rate at which the amplitude is varied from zero through its maximum value and back to zero is equal to the frequency of deviation of the antenna from its mean position, and is known hereinafter as its nodding rate.

Figure 2:
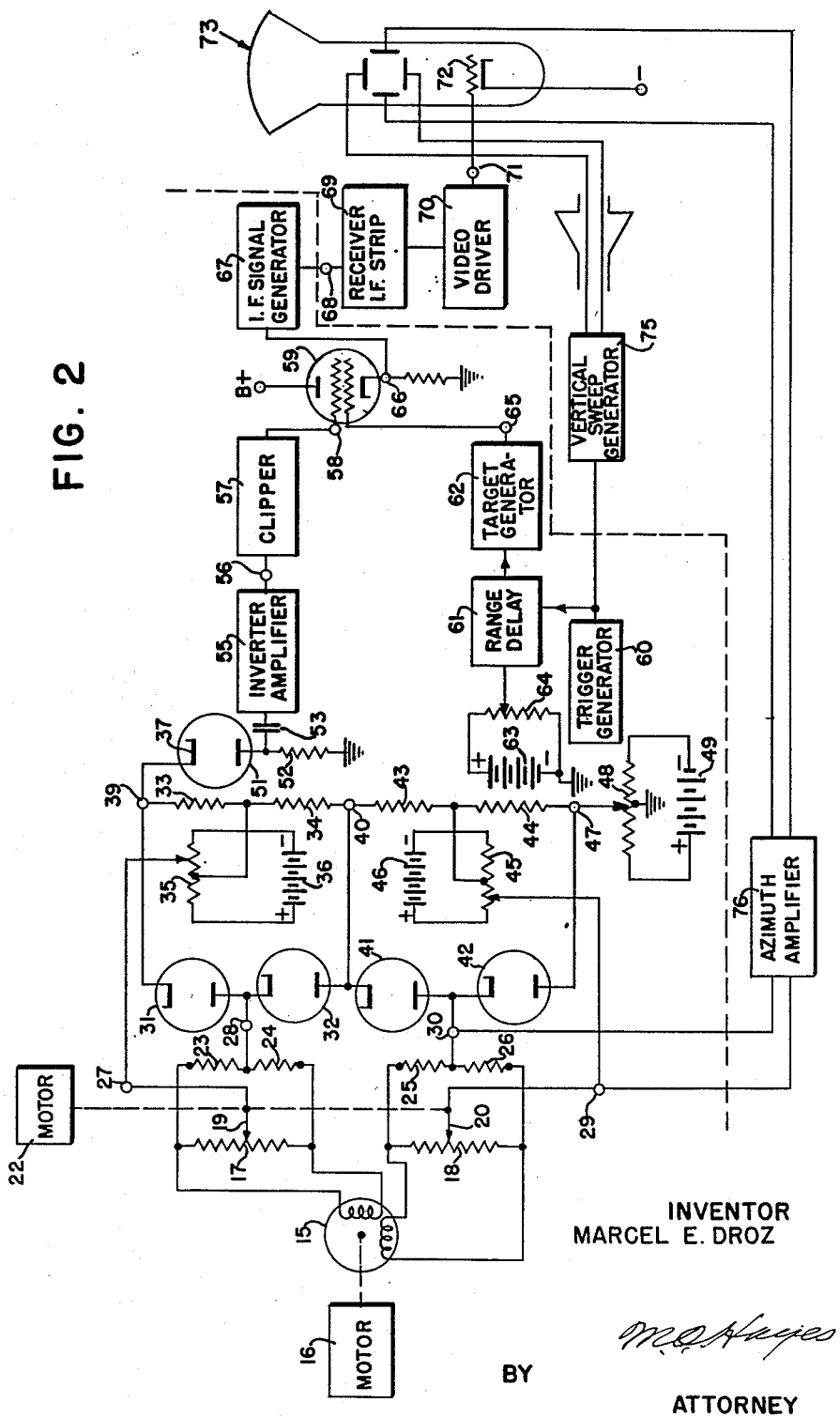
Fig. 2 is a schematic diagram of one embodiment of the invention.
Figures 3, 3A:
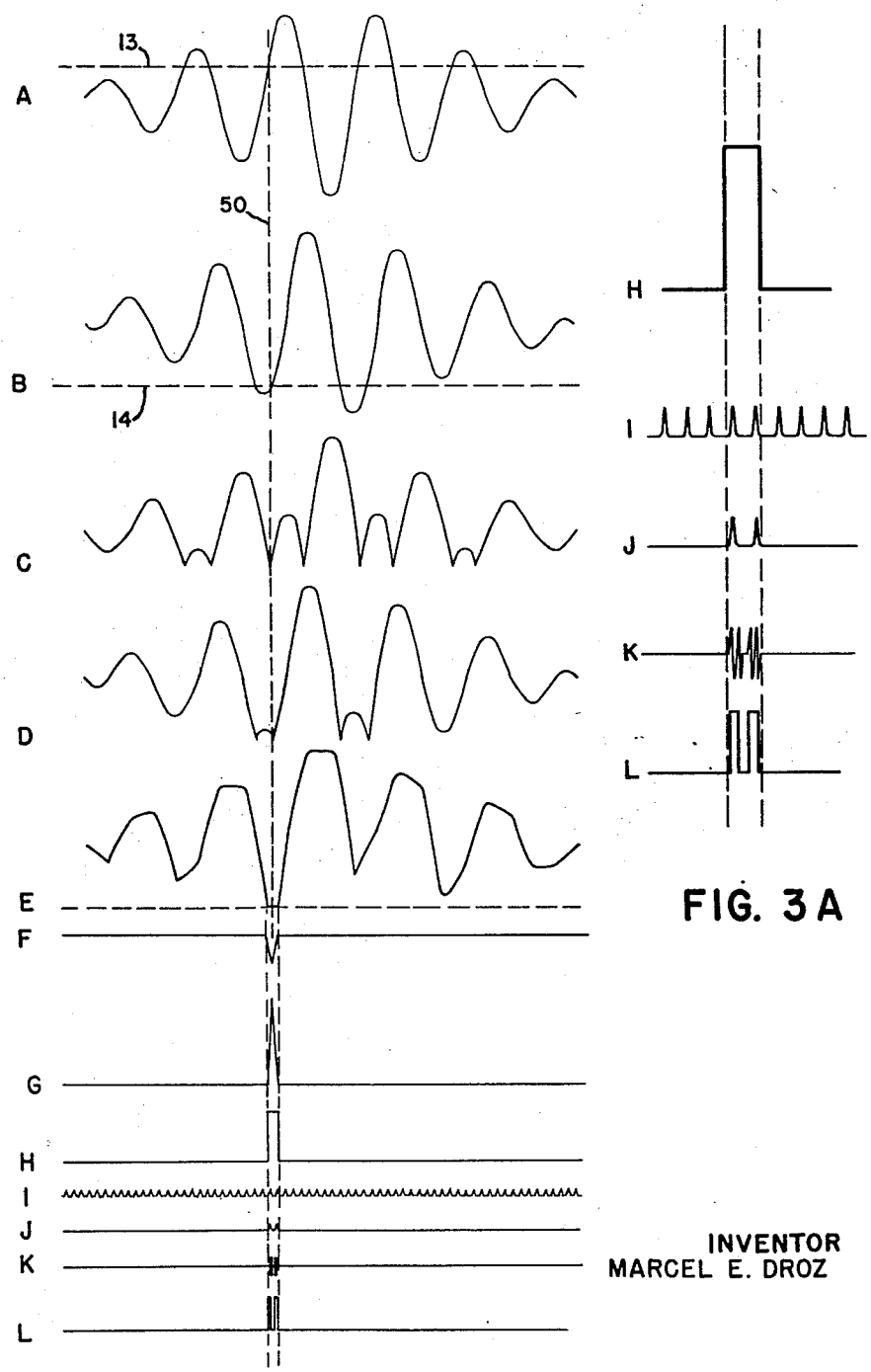
Fig. 3 shows some of the waveforms associated with the embodiment of Fig. 2, Fig. 3A being a portion of Fig. 3 enlarged.

Fig. 2 shows one embodiment of the invention as applied to a radar system such as is disclosed in patent application, Serial Number 531,826, filed April 19, 1944, by Louis N. Ridenour, Leland J. Haworth, and now Patent No. 2,606,318. The system disclosed in this application utilizes a conical scan of a type described hereinabove. The cathode ray tube display is of the type wherein the range of the target is proportional to the vertical displacement of the beam and the relative azimuth of the target is proportional to the horizontal displacement. A semaphore line is also traced by the spot, and the slope of this semaphore line is proportional to the relative elevation of the target. It is apparent that the above-described component motions, curves 11 and 12 of Fig. 1, may be represented by two voltages varying with respect to time as indicated by waveforms A and B respectively of Fig. 3. Such voltages may be produced by means of a two-phase alternator 15 (Fig. 2), driven by motor 16 at a speed proportional to that of the antenna of the radar set being simulated. The two outputs of alternator 15 are fed to potentiometers 17 and 18 where arms 19 and 20 are moved back and forth at a rate equal to the nodding rate of the antenna by means of motor 22 and an appropriate linkage. The combination of the linkage and method of winding potentiometers 17 and 18 is such to produce a linear variation of the output voltage from the potentiometers. The voltage across potentiometer 17 is applied to resistors 23 and 24 in series, and the voltage across potentiometer 18 is applied to resistors 25 and 26 in series. Thus the voltage between terminals 27 and 28 will appear as shown in waveform A (Fig. 3) and the voltage between terminals 29 and 30 will appear as shown in waveform B (Fig. 3). The frequency of these two voltages will then be equal to that of the simulated antenna rotation, and the rate at which the voltage is varied linearly by potentiometers 17 and 18 will be equal to the nodding rate of the simulated antenna.

Referring again to Fig. 1, it may be seen that a given point on the spiral scan, such as point $a$, corresponds to only one value of deflection in the vertical direction. These two values lie on lines 13 and 14 respectively. Although these lines intersect curves 11 and 12 at a plurality of points, only one such point lying both on line 13 and curve 11 coincides with a point lying both on line 14 and curve 12 with respect to time. These are points $b$ and $c$ respectively. For purposes of explanation, lines 13 and 14 are shown transferred on waveforms A and B respectively (Fig. 3).

Waveform A, developed between terminals 27 and 28, is applied to a bridge circuit comprising diode tubes 31 and 32, resistors 33 and 34, and a biasing circuit including a potentiometer 35 and battery 36. The rectified output of the bridge appears between terminals 39 and 40 and has a form as shown in wave form C (Fig. 3). The position of line 13, about which rectification takes place, may be varied by means of bias potentiometer 35 to provide a variable direct current level, thus varying the position of the minimum points of waveform C with respect to time.

Likewise, waveform B (Fig. 3) developed between terminals 29 and 30 is applied to a bridge circuit comprising diode tubes 41 and 42, resistors 43 and 44, and a biasing circuit including a potentiometer 45 and battery 46. The rectified output of the bridge appears between terminals 40 and 47 and has a form as shown in waveform D (Fig. 3). The position of line 14, about which rectification takes place, may be varied by means of bias potentiometer 45 to provide a variable direct current level, thus varying the position of the minimum points of waveform D with respect to time.

The voltages represented by waveforms C and D are added by simple series connection of resistors 33, 34, 43 and 44 to obtain the resultant waveform E (Fig. 3) appearing between terminals 39 and 47. The position of the baseline of waveform E may be varied by means of the biasing circuit comprising potentiometer 48 and battery 49.

Waveform E will have its minimum value only when the waveforms C and D reach their minimum values at the same instant of time, as indicated by line 50 on waveforms C, D and E. The time at which waveform E reaches its minimum value corresponds to points $b$ and $c$ on Fig. 1, since these are the points at which curves 11 and 12 simultaneously cross lines 13 and 14 about which they are rectified. Since the voltages shown in waveforms A and B are exactly analogous to the motions described by curves 11 and 12 respectively, it follows that the time determined by waveform E reaching its minimum value is identical with the time of occurence of points $b$ and $c$, which also designate the point $a$ on the spiral sweep, or the target location. As outlined above, the positions of lines 13 and 14 on waveforms A and B may be varied by means of potentiometers 35 and 45, thus shifting the minimum points of waveforms C and D and the line 50 with respect to time. Hence the apparent target position is variable, and an instructor by manipulation of potentiometers 35 and 45 may select the time of occurrence of points $b$ and $c$, thus presenting the target in any desired position on the screen of cathode ray tube 73.

Referring again to Fig. 2, the resultant voltage at terminal 39 (waveform E) is fed to cathode 37 of pick-off diode tube 51. The baseline of waveform E is adjusted so that rectification of the minimum point of waveform E takes place in diode tube 51, resulting in a pip having the form of waveform F appearing across resistor 52. This pip is then coupled through condenser 53 to inverter amplifier 55. After passing through inverter amplifier 55, the voltage will appear at terminal 56 as shown by waveform G (Fig. 3). This voltage is then applied to clipper 57 and will appear at terminal 58 as shown by waveform H (Fig. 3). The voltage pulse of waveform H is known as a gate. The width of this gate may be controlled by varying the baseline of waveform E by means of potentiometer 48. Terminal 58 is connected to the second grid of gate tube 59.

Meanwhile, trigger generator 60 may be delivering a series of pulses to range delay 61 at the repetition rate of the simulated system. Range delay 61 delays the pulses fed from trigger generator 60 to target generator 62 by an amount determined by the voltage fed into range delay 61 from battery 63 and potentiometer 64. Target generator 62 may generate a series of target signals variable in phase, depending upon the amount of the range delay, and having the characteristics of the simulated radar video signals including artificial noise, artificial sea return, amplitude decay proportional to range, etc. These target signals will appear at terminal 65 as shown by waveform I (Fig. 3) and are fed to the first grid of gate tube 59. During the time when the gate voltage represented by waveform H is at its maximum value, representing a target location, the signals from target generator 62 will pass through gate tube 59 and appear at its cathode terminal 66, as shown by waveform J (Fig. 3). One or more target signals will appear, depending on circuit adjustments, but for purposes of illustration, two target pips are shown on waveform J. These target pips are fed into I. F. signal generator 67, pulsing this signal generator so that the waveform of the voltage appearing at terminal 68 will be a series of pulses modulated at the intermediate frequency of the radar system receiver, as shown by waveform K (Fig. 3). This waveform is coupled into the input jack of the receiver intermediate frequency amplifier strip 69, there amplified and detected, and then fed to video driver 70. The output of video driver 70 will appear at terminal 71, as shown by waveform L (Fig. 3), and is applied to grid 72 of cathode ray tube 73 to intensify the electron beam in the conventional manner.

Vertical sweeps are fed to cathode ray tube 73 from trigger generator 60 through vertical sweep generator 75 which may generate a conventional "push-pull" sweep starting from a fixed baseline on the tube face and travelling upward, proportional to range. Since the delay caused by range delay 61 is adjustable, the signals will appear above the baseline of cathode ray tube 73 by an amount determined by the range voltage obtained from potentiometer 64. Thus, by manipulation of potentiometer 64, the instructor may vary the range of a simulated target for observation by the student at cathode ray tube 73.

Horizontal sweeps are taken directly from terminals 29 and 30, amplified by azimuth amplifier 76, and fed to the horizontal deflecting plates of cathode ray tube 73. Thus the horizontal deflection of the electron beam from the center of the tube face is proportional to the horizontal component of deflection of the simulated radar antenna.

Numerous additional applications of the above disclosed principles will occur to those skilled in the art and no attempt has been made to exhaust such possibilities. The scope of the invention is defined in the appended claims.

What is claimed is:

1. A radar training system comprising means for simulating the conical scan radar data normally derived from an antenna including manually operable potentiometer means for varying said scan data, means for simulating radar target information including manually operable potentiometer means for varying said target information, means for combining said simulated scan data and said simulated target information, and means for applying the combined output to the indicator circuits of a radar system.

2. A radar training system comprising means for producing two sinusoidal voltages in phase quadrature whose amplitudes may be caused to vary linearly with respect to time, means for rectifying said voltages about a variable D.-C. level and combining the rectified outputs, means for selecting the time of occurrence of the minimum value of said combined rectified outputs and producing a gate coinciding in time with said minimum value, means for producing trigger pulses, means for delaying said trigger pulses by a variable time interval, means for producing target signals in response to said delayed trigger pulses, a gate circuit which passes such target signals as occur in time coincidence with said gate, and means for producing signals in response to the output of said coincidence circuit.

3. A radar training system comprising a two-phase alternator for generating two sinusoidal voltages in phase quadrature, potentiometers for controlling the amplitude of each of said sinuoidal voltages, a motor and associated linkages for moving the arms of said potentiometers such that the amplitudes of said sinusoidal voltages are varied linearly with respect to time, bridge circuits for rectifying each of said sinusoidal voltages about desired direct voltage levels and adding the rectified voltages produced therein, a pick-off circuit for producing a pip of controllable width in time coincidence with the minimum value of said added rectified voltages, a trigger generator producing pulses at the repetition rate to be simulated, a range delay circuit for delaying said pulses by a desired amount, a target generator for producing target signals in response to said delayed signals, a gate circuit for passing said target signals during occurrence of said pip, a generator producing intermediate frequency signals during occurrence of each of said passed target signals, an indicator circuit, and means for impressing said intermediate frequency signals, the pulses from said trigger generator, and one of said sinusoidal voltages on said indicator circuit.

4. In a radar training system, means for producing two sinusoidal voltages in phase quadrature whose amplitudes may be caused to vary linearly with respect to time, means for rectifying said voltages about a variable D.-C. level and combining the rectified outputs, and means for selecting the time of occurrence of the minimum value of said combined rectified outputs.

5. A radar training system comprising means for producing sinusoidal voltages of different phase, means for varying the amplitudes of said voltages, means for rectifying and combining said voltages, means for producing and delaying a trigger pulse and means for simultaneously applying said combined voltages and said trigger pulses to a radar system.

6. In a radar training system, a trigger pulse generator for producing pulses at the repetition rate to be simulated, a delay circuit for delaying said pulses by a desired amount, a target signal generator for producing target signals in response to said delayed pulses, a generator for producing intermediate frequency signals, means for combining said target signals and said intermediate frequency signals and means for applying said combined target and intermediate frequency signals to the indicator of a radar system.

7. A radar training system comprising means for simulating conical scan data from an antenna, means for producing trigger pulses, means for producing target signals in response to said trigger pulses, a gate circuit for passing said target signals occurring in time coincidence with said gate, and means for applying said combined target and gate signals to the indicator of a radar system.

8. A radar training device comprising the combination with a radar indicator of means for generating a pair of sinusoidal voltages in phase quadrature, means for varying the envelopes of said sinusoidal voltages linearly with respect to time, means for rectifying and adding said linearly varying sinusoidal voltages, means for producing a pip of controllable width in time coincidence with the minimum value of said rectified and added voltages, means for producing simulated target signals, means for varying the time of application of said target signals to said radar indicator, said last-mentioned means including a coincidence circuit responsive in operation to time coincidence of said pip and said simulated target signals, said coincidence circuit during operation thereof permitting passage of said target signals to said radar indicator.

9. A radar training device comprising the combination with a radar indicator of a two-phase alternator for generating first and second sinusoidal voltages in phase quadrature, first and second potentiometers each having movable taps, said first and second sinusoidal voltages being applied across said first and second potentiometers, respectively, means for moving said movable taps across said potentiometers to cause the sinusoidal voltages appearing at said taps to vary linearly with respect to time, first and second rectifying circuits for rectifying the voltages on said movable taps of said first and second potentiometers, means for varying the bias on each of said rectifying circuits to determine the voltage levels about which rectification takes place, means for adding the rectified voltages, a pick-off circuit for producing a pip of predetermined width in time coincidence with the minimum value of the added rectified voltages, means for producing pulses at a frequency equal to the normal repetition rate at which said radar indicator is operated, means for delaying said pulses for a predetermined period, means for producing simulated target signals in response to said delayed pulses, a coincidence gate circuit for passing such of said target signals as coincide in time with said pip, means for producing signals at the intermediate frequency of said radar indicator during the time of occurrence of each of said passed target signals, and means for impressing said intermediate frequency signals, said pulses at the repetition rate and one of said sinusoidal voltages on said radar indicator.

10. In a radar training system, means for producing two sinusoidal voltages in phase quadrature whose amplitudes may be caused to vary linearly with respect to time, means for rectifying said voltages about a variable D. C. level and combining the rectified outputs, means for selecting the time of occurrence of the minimum value of said rectified outputs, and means for producing a gate coincident in time with said minimum value.

11. In a radar training system adapted to simulate radar target information and to feed said information to a radar indicator, means for producing two sinusoidal voltages in phase quadrature whose amplitudes may be caused to vary linearly with respect to time, means for rectifying said voltages about a variable D. C. level and for adding said voltages, means for selecting the time of occurrence of the minimum value of the sum of said rectified voltages and producing a gate coincident in time with said minimum sum value, means for producing target signals, a gate circuit adapted to pass such target signals as they occur in time coincidence with said gate, and means for producing signals in response to the output of said coincidence circuit.

12. In a radar training system, means for providing sinusoidal voltages of different phase, first and second potentiometers each having movable taps, said first and second sinusoidal voltages being applied across said first and second potentiometers, respectively, means for moving said movable taps across said potentiometers to cause the sinusoidal voltages appearing at said taps to vary linearly with respect to time, means for rectifying the voltages on said taps about a variable D. C. level, means for adding the rectified voltages, and means for producing a signal in time coincidence with the minimum value of the sum of said rectified voltages.

13. In a radar training device, means for producing sinusoidal voltages of different phase, means including potentiometer means for modulating the amplitude of said voltages linearly with respect to time, means for rectifying said modulated voltages and for adding said rectified voltages, and means for producing a signal in time coincidence with the minimum value of said added voltages.

References Cited in the file of this patent

UNITED STATES PATENTS

| Number | Name | Date |
| --- | --- | --- |
| 2,399,661 | Bowie | May 7, 1946 |
| 2,409,448 | Rost et al. | Oct. 15, 1946 |
| 2,412,612 | Godet | Dec. 17, 1946 |
| 2,438,888 | Andrews | Apr. 6, 1948 |
| 2,438,940 | Pennoyer | Apr. 6, 1948 |
| 2,439,169 | Kittredge | Apr. 6, 1948 |
| 2,442,351 | Fritschi | June 1, 1948 |
| 2,453,743 | Cesareo | Nov. 16, 1948 |
| 2,492,356 | Cesareo | Dec. 27, 1949 |
| 2,617,982 | Holschuh et al. | Nov. 11, 1952 |